United States Patent
Singla et al.

(10) Patent No.: US 12,254,209 B1
(45) Date of Patent: Mar. 18, 2025

(54) TIME BOUND PARTIAL FORMAT OPERATION IN A STORAGE DEVICE

(71) Applicant: WESTERN DIGITAL TECHNOLOGIES, INC., San Jose, CA (US)

(72) Inventors: Lovish Singla, Bangalore (IN); Ramkumar Ramamurthy, Bangalore (IN); Shaheed Nehal A, Bangalore (IN)

(73) Assignee: Sandisk Technologies, LLC, Milpitas, CA (US)

( * ) Notice: Subject to any disclaimer, the term of this patent is extended or adjusted under 35 U.S.C. 154(b) by 0 days.

(21) Appl. No.: 18/383,854

(22) Filed: Oct. 25, 2023

(51) Int. Cl.
*G06F 12/00* (2006.01)
*G06F 3/06* (2006.01)
*G06F 12/02* (2006.01)

(52) U.S. Cl.
CPC .......... *G06F 3/0652* (2013.01); *G06F 3/0619* (2013.01); *G06F 3/0659* (2013.01); *G06F 3/0679* (2013.01); *G06F 12/0292* (2013.01); *G06F 2212/1032* (2013.01)

(58) Field of Classification Search
CPC .... G06F 3/0652; G06F 3/0619; G06F 3/0659; G06F 3/0679; G06F 12/0292; G06F 12/0238; G06F 2212/1032; G06F 2212/72
See application file for complete search history.

(56) References Cited

U.S. PATENT DOCUMENTS

| | | |
|---|---|---|
| 9,389,998 B2 | 7/2016 | Lee |
| 10,126,970 B2 | 11/2018 | Shaharabany |
| 11,164,599 B2 | 11/2021 | Paveza |
| 11,543,992 B2 | 1/2023 | Bhat |
| 2020/0301606 A1 * | 9/2020 | Muthiah ............... G06F 3/0659 |
| 2022/0413701 A1 | 12/2022 | Kim |

* cited by examiner

*Primary Examiner* — Shawn X Gu

(74) *Attorney, Agent, or Firm* — Neal Blibo LLC; Arlene P. Neal

(57) ABSTRACT

A storage device performs a format operation for host devices using different format times and commands configurations. When a controller on the storage device receives an erase command from a host device, the controller determines the format time and a chunk size associated with data in the erase command. The controller executes a first format operation scheme, a second format operation scheme, or a third format operation scheme to perform an erase operation on the data in the erase command within the format time. The controller halts execution of the erase operation and returns operation to the host device when the format time expires.

20 Claims, 8 Drawing Sheets

TIME BOUND PARTIAL FORMAT OPERATION IN A STORAGE DEVICE

BACKGROUND

A storage device may be communicatively coupled to a host and to non-volatile memory including, for example, a NAND flash memory device on which the storage device may store data received from the host. The storage device may store data in blocks on the memory device and the host may address the data using logical block addresses that may be mapped to physical addresses on the memory device. The logical block address to physical address mappings may be stored in a logical-to-physical (L2P) table cached in the storage device and the storage device may access the L2P table to retrieve data from the memory device.

When the storage device is initially plugged into the host, the host may perform a format operation by issuing erase command(s) to the storage device to erase the contents of the storage device. The erase command(s) may be associated with a range of logical block addresses. When the storage device receives an erase command for a range of logical block addresses from the host, the storage device may invalidate the L2P mappings in its control pages for those logical block addresses. The storage device specification may provide a maximum format time that the storage device may take to perform the format operation (i.e., the maximum time period for the storage device to invalidate the L2P entries). For example, the specification may define the maximum time for the format operation to be 250 times the number of sectors to erase in milliseconds.

Some hosts may not follow the storage device's specification that defines the maximum format time. For example, to improve user experience, some hosts may expect the storage device to complete the format operation in a shorter time period than is provided by the specification. If the storage device does not complete the format operation in the time expected by the host, the host may reboot the storage device repeatedly or rerun the format operation repeatedly, which may cause the host to enter a loop. After a certain amount of time in the loop, the host may return an error which may indicate that the device is unusable and/or inaccessible.

As flash technology advances towards ultra-high-capacity products, the time needed to perform a format operation may also increase proportionately to the storage device's capacity. Consider an example where the capacity of the storage device is 1.5 Terabytes. When the host issues an erase command with logical block addresses, for example, for 1.2 Terabytes, the controller may look up each logical block address in an internal table, and if the there is a valid mapping for that logical block address, the controller may invalidate the associated L2P page entry. In high-capacity storage devices, the time needed to invalidate the L2P page entries may be more time due to the increased number of L2P entries in higher capacity products, which may cause the host to return an error indicating that the device is unusable and/or inaccessible.

SUMMARY

In some implementations, the storage device may perform a format operation for host devices using different format times and commands configurations. The storage device may include a memory device to store data. A controller on the storage device may receive an erase command from a host device and determine a format time and a chunk size associated with data in the erase command. The controller may execute a format operation scheme to perform an erase operation on the data in the erase command within the format time. The controller may halt execution of the erase operation and return operation to the host device when the format time expires.

In some implementations, a method is provided for performing a format operation on a storage device for host devices using different format times and commands configurations. The method includes receiving an erase command from a host device and determining a format time and a chunk size associated with data in the erase command. The method also includes executing a first format operation scheme, a second format operation scheme, or a third format operation scheme to perform an erase operation on the data in the erase command within the format time. The first format operation scheme includes calculating a chunk erase time during which to perform the erase operation on a chunk of data and halting execution of the erase operation on the chunk of data when the chunk erase time expires. The second format operation scheme includes starting an erase timer upon receipt of the erase command and running the erase timer until another host command is received or the format time expires. The third format operation scheme includes determining that the erase command is for a single chunk including logical block addresses starting from a first logical block address and ending with a last logical block address in a logical-to-physical table, setting a valid fragment count for each meta block to zero, and erasing control pages. The method further includes halting execution of the erase operation and returning operation to the host device when the format time expires.

Figure 1:
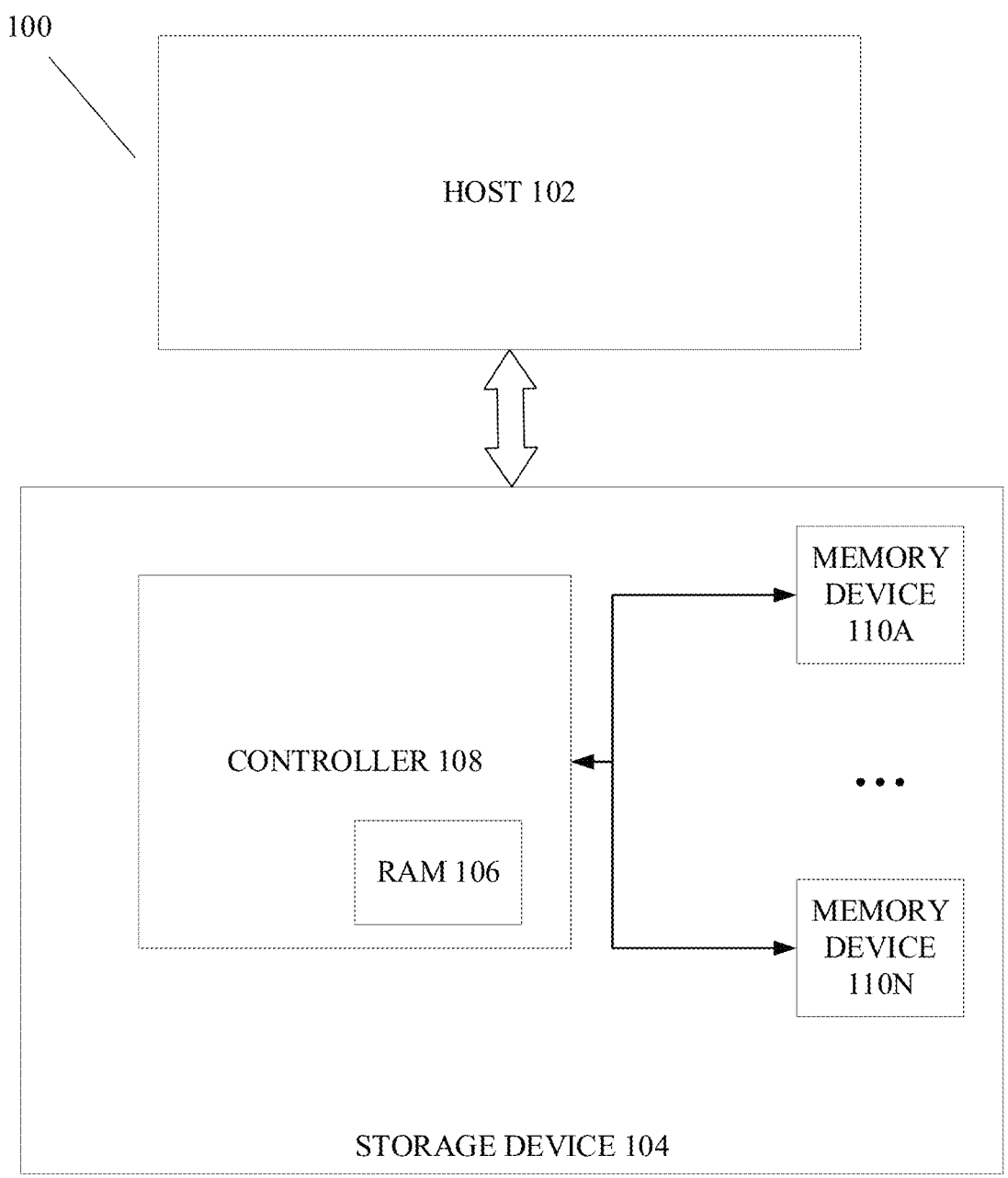
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 and storage device 104 may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a random-access memory (RAM) 106, a controller 108, and one or more non-volatile memory devices 110a-110n (referred to herein as the memory device(s) 110). Storage device 104 may be, for example, a solid-state drive (SSD), and the like. RAM 106 may be temporary storage such as a dynamic RAM (DRAM) that may be used to store information such as L2P entries.

Controller 108 may interface with host 102 and process foreground operations including instructions transmitted from host 102. For example, controller 108 may read data from and/or write to memory device 110 based on instructions received from host 102. Controller 108 may also erase data from memory device 110 based on instructions received from host 102. Controller 108 may further execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash based. For example, memory device 110 may be a NAND flash memory that may be used for storing host and control data over the operational life of memory device 110. Memory device 110 may be included in storage device 104 or may be otherwise communicatively coupled to storage device 104.

When host 102 wants to perform a format operation on storage device 104, host 102 may issue different configurations of erase commands. For example, host 102 may issue a single erase command wherein the erase command may instruct controller 108 to invalidate all L2P entries on storage device 104. Host 102 may also issue several erase commands for one format operation, wherein each erase command may instruct storage device 104 to invalidate a range of L2P entries associated with a chunk of data, and when all of the erase commands are executed, all the L2P entries on storage device 104 may be invalidated. For example, each erase command may be to invalidate a range of L2P entries associated with 10 gigabytes (GB) of data. As the format operation is carried out using one or more standard erase commands, controller 108 may have to determine when an erase command received from host 102 is associated with a format operation or when the erase command is issued to erase a subset amount of data from storage device 104.

Host 102 may have a stringent format timeout period to, for example, ensure its users are not waiting for long periods for the format operation to complete. In some cases, host 102 may send a format time, i.e., the time that host 102 expects a in format operation to be completed to storage device 104. In some cases, controller 108 may use the format time provided by a storage device specification or may use another predefined time as the format time. If storage device 104 does not complete the format operation within the format time, host 102 may reboot and/or generate an error which may indicate that storage device 104 is unusable or inaccessible.

Controller 108 may also dynamically calculate the format time associated with executing a format operation. Consider an example where controller 108 uses the format time provided by the storage device specification. If the format operation fails before the format time expires (i.e., if host 102 reboots and/or returns an error before the format time expires), controller 108 may reduce the format time provided by the storage device specification and execute the format operation. For example, if the format time provided by the storage device specification is two minutes and if the format operation fails before the two minutes expire, controller 108 may reduce the format time to one minute and execute the format operation. If the format operation again fails before the format time expires, controller 108 may continue to reduce the format time until it can successfully execute the format operation within a reduced format time. When controller 108 is able to successfully complete the format operation within a reduced format time, controller 108 may assign the reduced format time as the format time needed to execute format operations for host 102.

To ensure interoperability with hosts using different schemes to send erase commands to format storage device 104 and to ensure that storage device 104 returns operations to host 102 as needed by different format time requirements, storage device 104 may execute different format operation schemes. In a first format operation scheme, controller 108 may determine the format time, the capacity of storage device 104, and the chunk size associated with an erase command. Controller 108 may determine the total number of chunks that it may need to erase to format storage device 104 and may calculate a chunk erase time, i.e., the time to be assigned to erase the chunk of data associated with the erase command. Controller 108 may perform an erase operation on the chunk of data in the erase command for the chunk erase time, and after the chunk erase time expires, controller 108 may stop performing the erase operation on that chunk of data. For example, controller 108 may begin invalidating the L2P entries for the logical block addresses in the chunk of data in the erase command, and when the chunk erase time expires, controller 108 may stop invalidating the L2P entries for the logical block addresses in that chunk of data. In some cases, controller 108 may keep track of the logical block addresses in that chunk of data that were not invalidated before the chunk erase time expired and may invalidate the L2P entries for those logical block addresses during background operations.

Consider an example where host 102 may format storage device 104 by sending erase commands to erase 10 GB chunks of data. If, for example, controller 108 determines that host 102 expects a format operation to be completed in sixty seconds and that the total capacity of storage device 104 is 1536 GB, controller 108 may determine the total number of chunks that it may need to erase to format storage device 104. For example, controller 108 may calculate the total number of chunks to erase by dividing the total capacity of the storage drive by the chunk size+1 (i.e., (1536 GB/10 GB)+1=154). Controller 108 may then divide the format time by the total number of chunks to obtain the chunk erase time (i.e., 60/154)=0.389 sec=389 milliseconds. For each erase command controller 108 receives, controller 108 may begin invalidating the L2P entries for the associated logical block addresses in the erase command for the chunk erase time (i.e., 389 milliseconds). After 389 milliseconds, controller 108 may stop invalidating the L2P entries for the logical block addresses for that 10 GB chunk of data. In some cases, controller 108 may invalidate the logical block addresses that were not invalidated within the chunk erase time during background operations.

If, for example, host 102 sends an erase command to erase the total capacity of the drive, controller 108 may determine that the chunk size is one and that the chunk erase time for that chunk is sixty seconds (i.e., the format erase time). Controller 108 may begin invalidating the L2P entries for the associated logical block addresses in the erase command, and after sixty seconds, controller 108 may stop performing the erase operation. Controller 108 may keep track of the logical block addresses that were not invalidated and may invalidate those logical block addresses during background operations.

In a second format operation scheme, when storage device 104 receives an erase command from host 102, controller 108 may start an erase timer. Controller 108 may run the erase timer until it receives another command from host 102 that is not an erase command or until the format time expires. Using the example where the format time is sixty seconds, when storage device 104 receives a first erase command from host 102, controller 108 may start the erase timer. If storage device 104 does not receive another host command that is not an erase command, controller may invalidate L2P entries associated with the logical block addresses in the erase commands for sixty seconds. After the format time expires, controller 108 may stop performing the erase operation and stop invalidating the L2P entries. Controller 108 may keep track of the logical block addresses that were not invalidated and may invalidate those logical block addresses during background operations.

Using the example above where host 102 issues erase commands to erase 10 GB chunks of data, when controller 108 receives the erase command for the first 10 GB chunk, controller 108 may start the erase timer. If host 102 issues 154 erase commands to invalidate the L2P entries for the entire capacity (i.e., 1536 GB), controller 108 may complete the erase operations, for example, for the first 100 erase commands within the format time. Controller 108 may thus invalidate all the L2P entries for the logical block addresses in the first 100 erase commands. When the format time expires, controller 108 may stop processing the erase operations for the remaining fifty-four erase commands and may not invalidate the L2P entries for the logical block addresses in the remaining fifty-four erase commands. Controller 108 may keep track of the logical block addresses in the remaining fifty-four erase command that were not invalidated and may invalidate those logical block addresses during background operations.

Similar to the first format operation scheme, in the second format operation scheme, when host 102 issues an erase command for a single chunk including logical block addresses starting from the first logical block address to the last logical block address in the L2P table, controller 108 may perform the erase operation for sixty seconds (i.e., the format time). Controller 108 may stop invalidating L2P entries for logical block addresses when the format time expires. Controller 108 may keep track of the logical block addresses that were not invalidated and may invalidate L2P entries for those logical block addresses during background operations.

When controller 108 receives an erase command for a first chunk of data, controller 108 may start the erase timer and begin invalidating L2P entries associated with the logical block addresses in the erase command. If host 102 issues another command that is not an erase command before the format time expires, controller 108 may determine that the erase command is not associated with a format operation and may reset the erase timer.

Continuing with the example where the format time is sixty seconds, the capacity of storage device is 1536 GB, and host 102 issues erase commands to erase chunks of data (i.e., 10 GB chunks of data), controller 108 may start the erase timer when it received the first erase command. If, for example, host 102 issues 154 erase commands to format storage device 104, controller 108 may begin invalidating L2P entries associated with the logical block addresses in the erase commands until the format time expires. If on the other hand, after host 102 sends the third erase command host 102 sends a write command, controller 108 may reset the erase timer when it receives the write command and determine that the three erase commands it received from host 102 were not associated with a format operation. This scheme may thus enable storage device 104 to differentiate erase commands that are associated with format operations from those that are not.

In a third format operation scheme, when host 102 issues an erase command for a single chunk including logical block addresses starting from the first logical block address and ending with the last logical block address in the L2P table, controller 108 may set a valid fragment count (VFC) for each meta block to zero and erase the control pages, rather than invalidating each logical block address. The VFC may be a counter associated with a meta-block that indicates the number of valid entries in a meta block.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
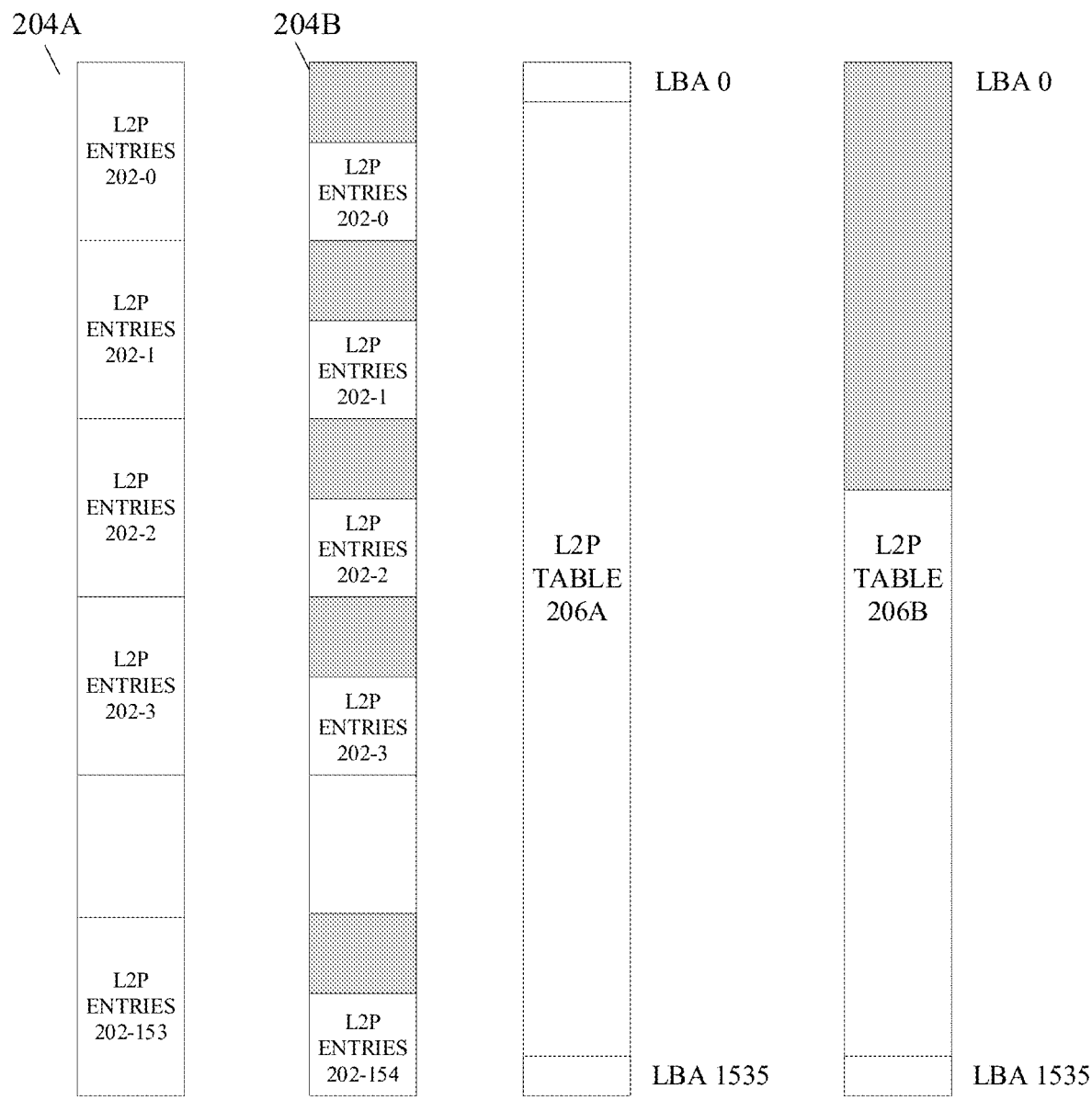
FIG. 2 includes block diagrams showing how L2P entries are processed according to a first format operation scheme in accordance with some implementations.

FIG. 2 includes block diagrams showing how L2P entries are processed according to a first format operation scheme in accordance with some implementations. Host 102 may format storage device 104 with a 1536 GB capacity by sending erase commands. Each erase command may instruct storage device 104 to erase 10 GB chunks of data. The L2P entries for the logical block addresses in the 10 GB chunk of data associated with the first erase command are shown as entries 202-0, the L2P entries for the logical block addresses in the 10 GB chunk of data associated with the second erase command are shown as entries 202-1, and so on, with the L2P entries for the logical block addresses in the 10 GB chunk of data associated with the last erase command shown as entries 202-153. Entries 202-0 to 202-153 are referred to generally herein as entries 202. If controller 108 determines that host 102 expects a format operation to be completed in sixty seconds, controller 108 may determine the total number of chunks that it may need to erase to format storage device 104 (i.e., (1536 GB/10 GB)+1=154) and the chunk erase time (i.e., 60/154)=0.389 sec=389 milliseconds.

L2P table 204A shows entries 202 prior to controller 108 processing the erase operations according to the first format operation scheme. For demonstration purposes, L2P table 204A is divided into 154 blocks, with each block including the L2P entries for 10 GB of data. L2P table 204B shows entries 202 after controller 108 has processed the erase operations according to the first format operation scheme. For each erase command controller 108 receives, controller 108 may invalidate L2P entries for the logical block addresses in the erase command until the chunk erase time (i.e., 389 milliseconds) expires. After the chunk erase time expires, controller 108 may stop invalidating L2P entries for the logical block addresses in that chunk of data. For example, L2P table 204B shows a shaded section in each block, wherein the shaded section may represent L2P entries that were invalidated prior to the expiry of the chunk erase time and the non-shaded sections may represent L2P entries that were not invalided prior to the expiration of the chunk erase time.

L2P table 206A shows an L2P table stored on storage device 104 prior to controller 108 processing an erase operation according to the first format operation scheme. L2P table 206A may include L2P entries for the 1536 GB capacity of storage device 104. Host 102 may send an erase command to erase the total capacity of the drive, wherein the erase command may include the starting logical block address ((LBA)0) and the last logical block address (LBA 1535) in L2P table 206A. Controller 108 may determine that the chunk size is 1 and that the chunk erase time for that chunk is sixty second which is also the full the format time. Controller 108 may invalidate L2P entries for logical block addresses in the erase command until the format time (i.e., sixty seconds) expires. After the format time expires, controller 108 may stop invalidating L2P entries in L2P table 206A. For example, L2P table 206B shows a shaded section that may represent the L2P entries that were invalidated prior to the expiry of the format time and the non-shaded sections may represent L2P entries that were not invalidated prior to the expiration of the format time. FIG. 2 is provided as an example. Other examples may differ from what is described in FIG. 2.

Figure 3:
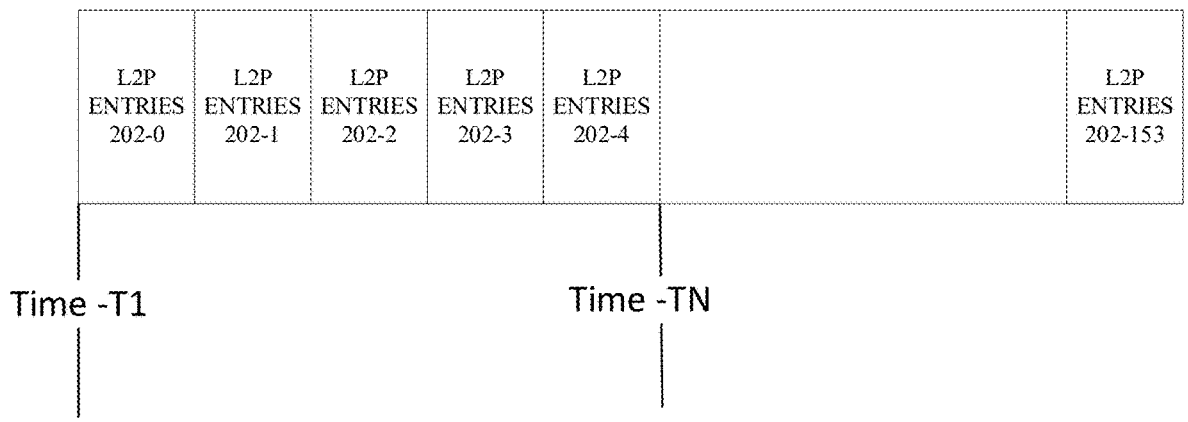
FIG. 3 includes block diagrams showing how L2P entries are processed according to a second format operation scheme in accordance with some implementations.
Figure 3:
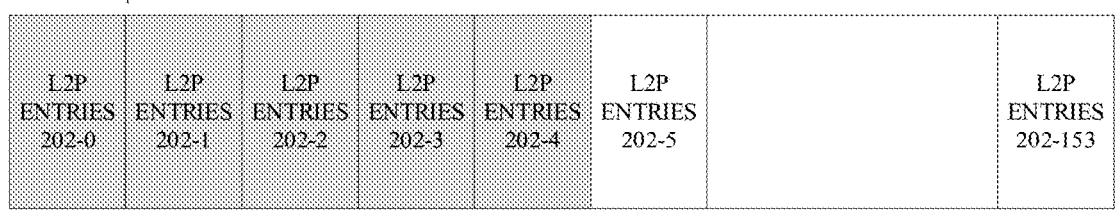
Figure 3:
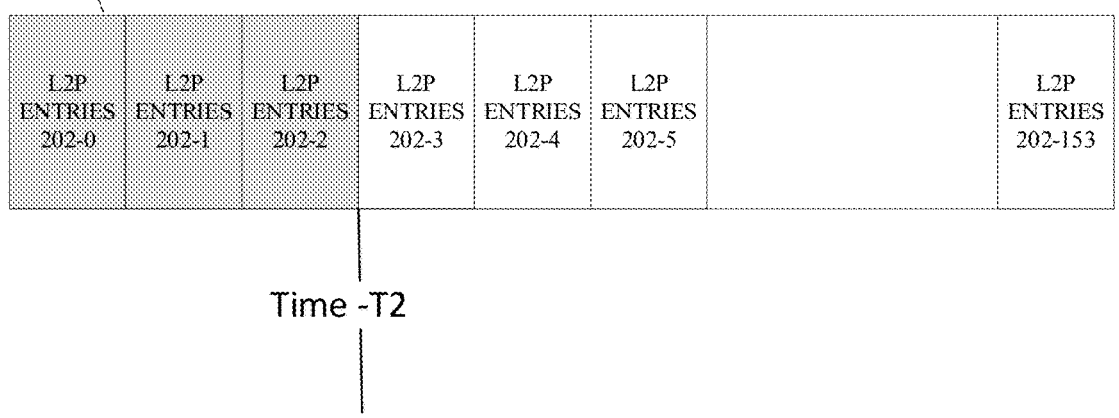

FIG. 3 includes block diagrams showing how L2P entries are processed according to a second format operation scheme in accordance with some implementations. For demonstration purposes, L2P table 302A is divided into 154 blocks, with each block including the L2P entries for 10 GB of data. L2P table 302A shows the L2P entries prior to controller 108 processing the erase operations according to the second format operation scheme. When storage device 104 receives an erase command from host 102 at time-T1, controller 108 may start an erase timer. Controller 108 may run the erase timer until it receives another command from host 102 that is not an erase command or until the format time expires at time-TN.

L2P table 302B shows the L2P entries after controller 108 has processed the erase operations according to the second format operation scheme. Controller 108 may invalidate L2P entries in 202-0 to 202-4 for logical block addresses in the erase command until the format time expires. After the format time expires, controller 108 may stop invalidating L2P entries in 202-5 to 202-153. For example, L2P table 302B shows a shaded section that may represent the L2P entries that were invalidated prior to the expiry of the format time and the non-shaded sections may represent L2P entries that were not invalided prior to the expiration of the format time.

L2P table 304 shows the L2P entries after controller 108 has processed the erase operations according to the second format operation scheme. Controller 108 may invalidate L2P entries in 202-0 to 202-2 for logical block addresses in erase command(s) until controller 108 receives another host command that is not an erase command. When controller 108 receives the other host command at time-T2, even though the format time has not expired, controller 108 may reset the erase timer. As indicated above FIG. 3 is provided as an example. Other examples may differ from what is described in FIG. 3.

Figure 4:
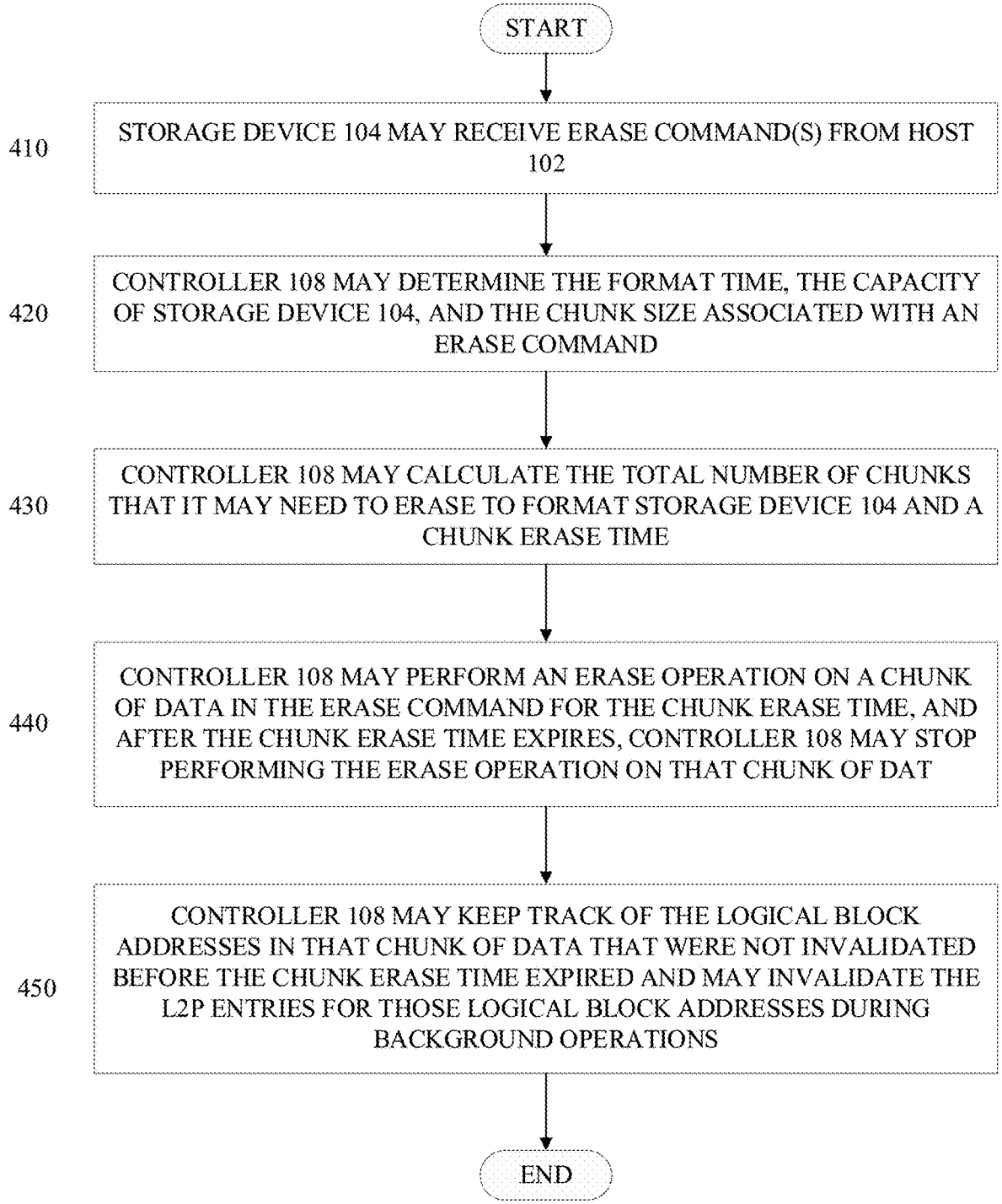
FIG. 4 is a flow diagram of an example process for processing L2P entries according to the first format operation scheme in accordance with some implementations.

FIG. 4 is a flow diagram of an example process for processing L2P entries according to a first format operation scheme in accordance with some implementations. At 410, storage device 104 may receive erase command(s) from host 102. At 420, controller 108 may determine the format time, the capacity of storage device 104, and the chunk size associated with an erase command. At 430, controller 108 may calculate the total number of chunks that it may need to erase to format storage device 104 and a chunk erase time. At 440, controller 108 may perform an erase operation on a chunk of data in the erase command for the chunk erase time, and after the chunk erase time expires, controller 108 may stop performing the erase operation on that chunk of data. At 450, controller 108 may keep track of the logical block addresses in that chunk of data that were not invalidated before the chunk erase time expired and may invalidate the L2P entries for those logical block addresses during background operations. As indicated above FIG. 4 is provided as an example. Other examples may differ from what is described in FIG. 4.

Figure 5:
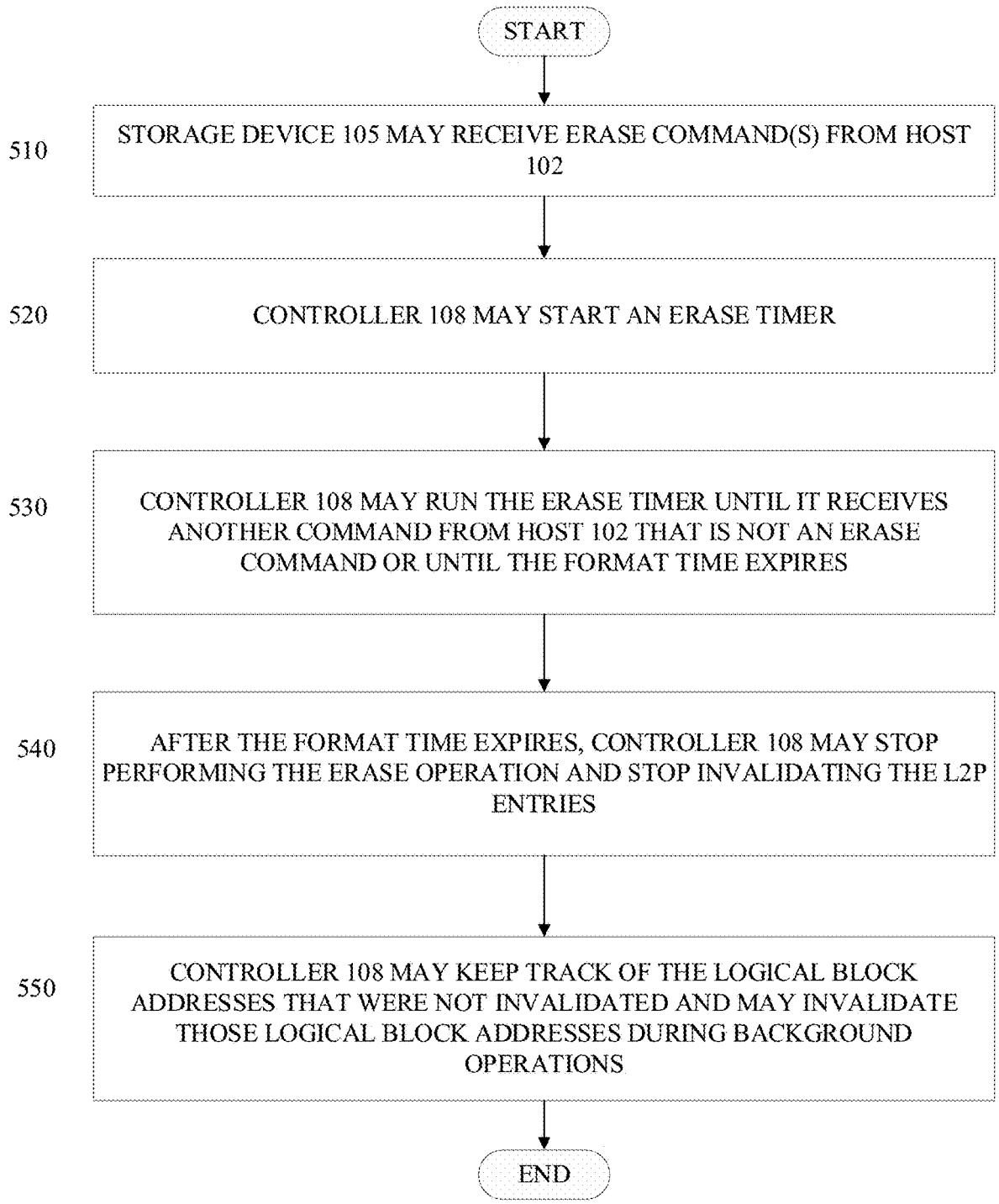
FIG. 5 is a flow diagram of an example process for processing L2P entries according to the second format operation scheme in accordance with some implementations.

FIG. 5 is a flow diagram of an example process for processing L2P entries according to a second format operation scheme in accordance with some implementations. At 510, storage device 104 may receive erase command(s) from host 102. At 520, controller 108 may start an erase timer. At 530, controller 108 may run the erase timer until it receives another command from host 102 that is not an erase command or until the format time expires. At 540, after the format time expires, controller 108 may stop performing the erase operation and stop invalidating the L2P entries. At 550, controller 108 may keep track of the logical block addresses that were not invalidated and may invalidate those logical block addresses during background operations. As indicated above FIG. 5 is provided as an example. Other examples may differ from what is described in FIG. 5.

Figure 6:
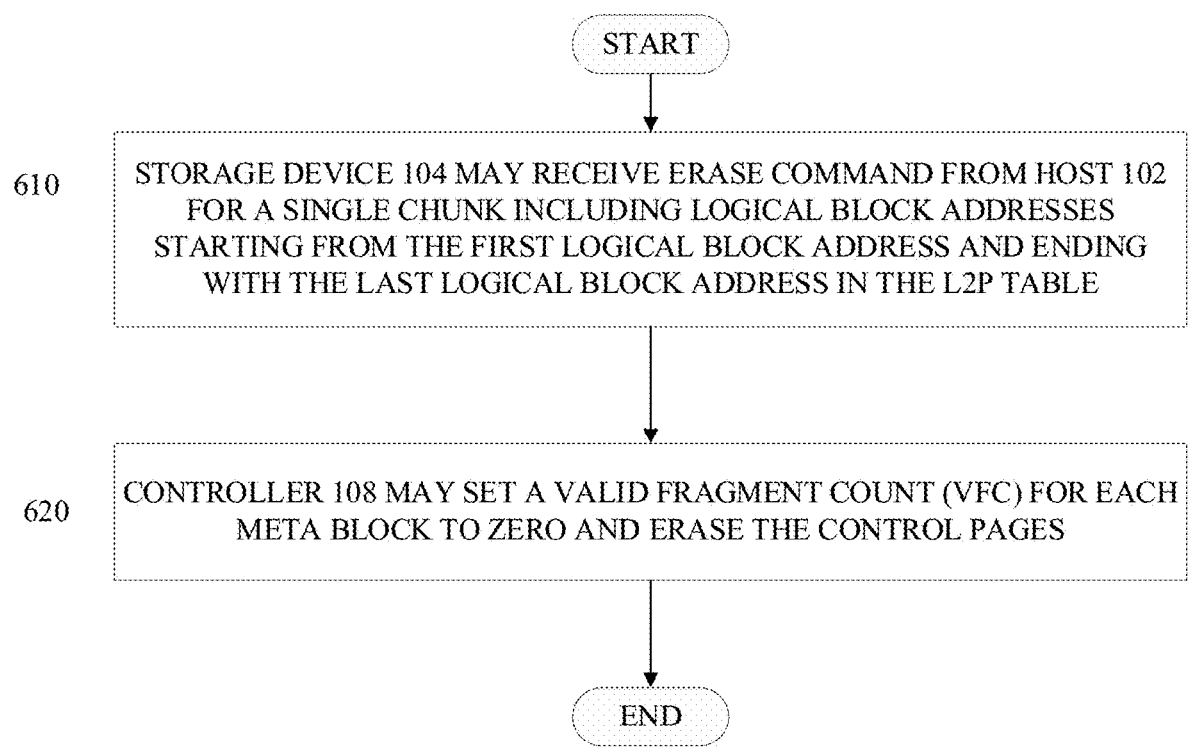
FIG. 6 is a flow diagram of an example process for processing L2P entries according to a third format operation scheme in accordance with some implementations.

FIG. 6 is a flow diagram of an example process for processing L2P entries according to a third format operation scheme in accordance with some implementations. At 610, storage device 104 may receive erase command from host 102 for a single chunk including logical block addresses starting from the first logical block address and ending with the last logical block address in the L2P table. At 620, controller 108 may set a valid fragment count (VFC) for each meta block to zero and erase the control pages. As indicated above FIG. 6 is provided as an example. Other examples may differ from what is described in FIG. 7.

Figure 7:
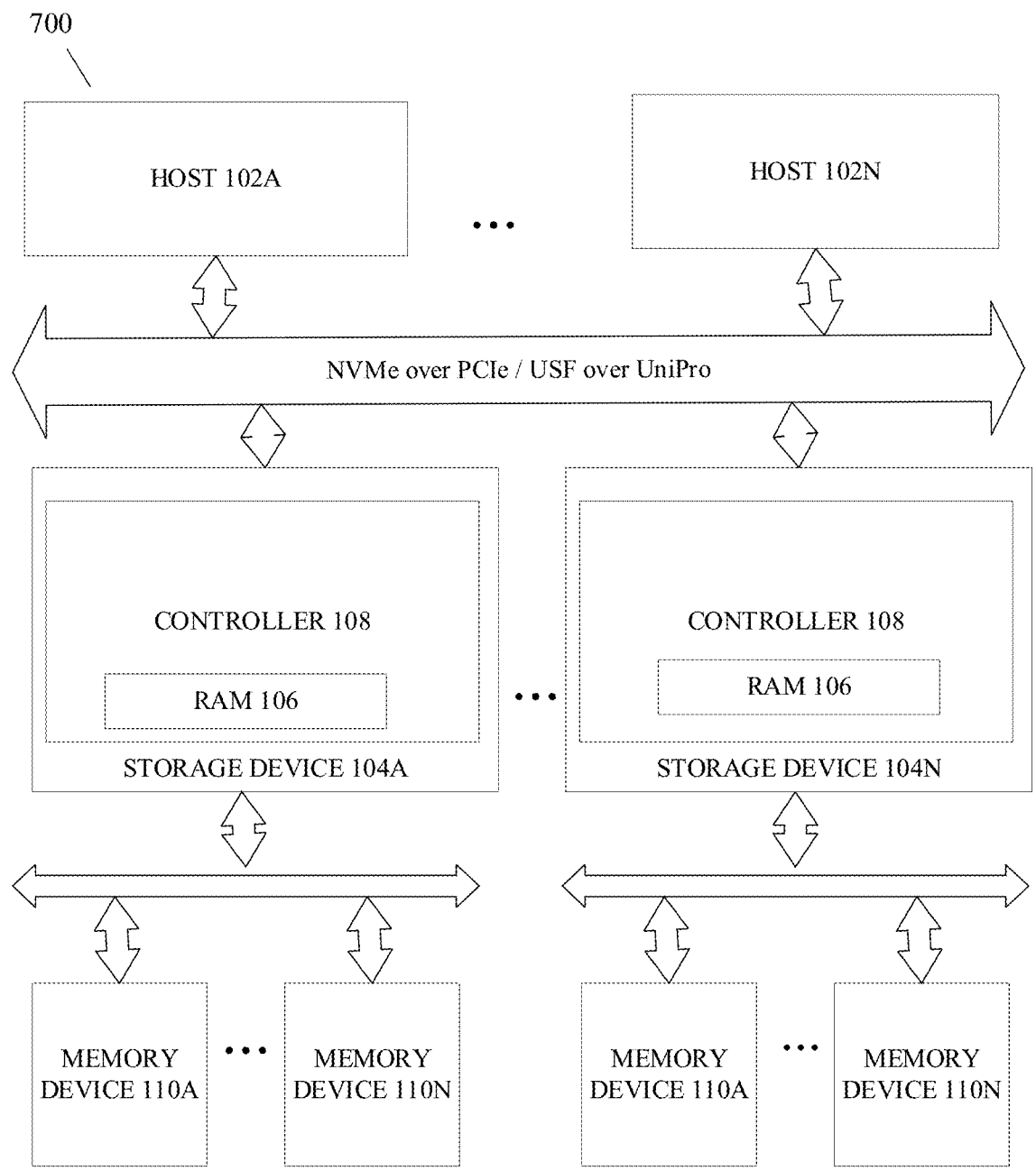
FIG. 7 is a diagram of an example environment in which systems and/or methods described herein are implemented.

FIG. 7 is a diagram of an example environment in which systems and/or methods described herein are implemented.

As shown in FIG. 7, Environment 700 may include hosts 102-102n (referred to herein as host(s) 102), and storage devices 104a-104n (referred to herein as storage device(s) 104).

Storage device 104 may include a controller 108 to manage the resources on storage device 104. Controller 108 may format storage device 104 according to different format times and command configurations. Hosts 102 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 700 may interconnect via wired connections, wireless connections, or a combination of wired and wireless connections. For example, the network of FIG. 7 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of Environment 700 may perform one or more functions described as being performed by another set of devices of Environment 700.

Figure 8:
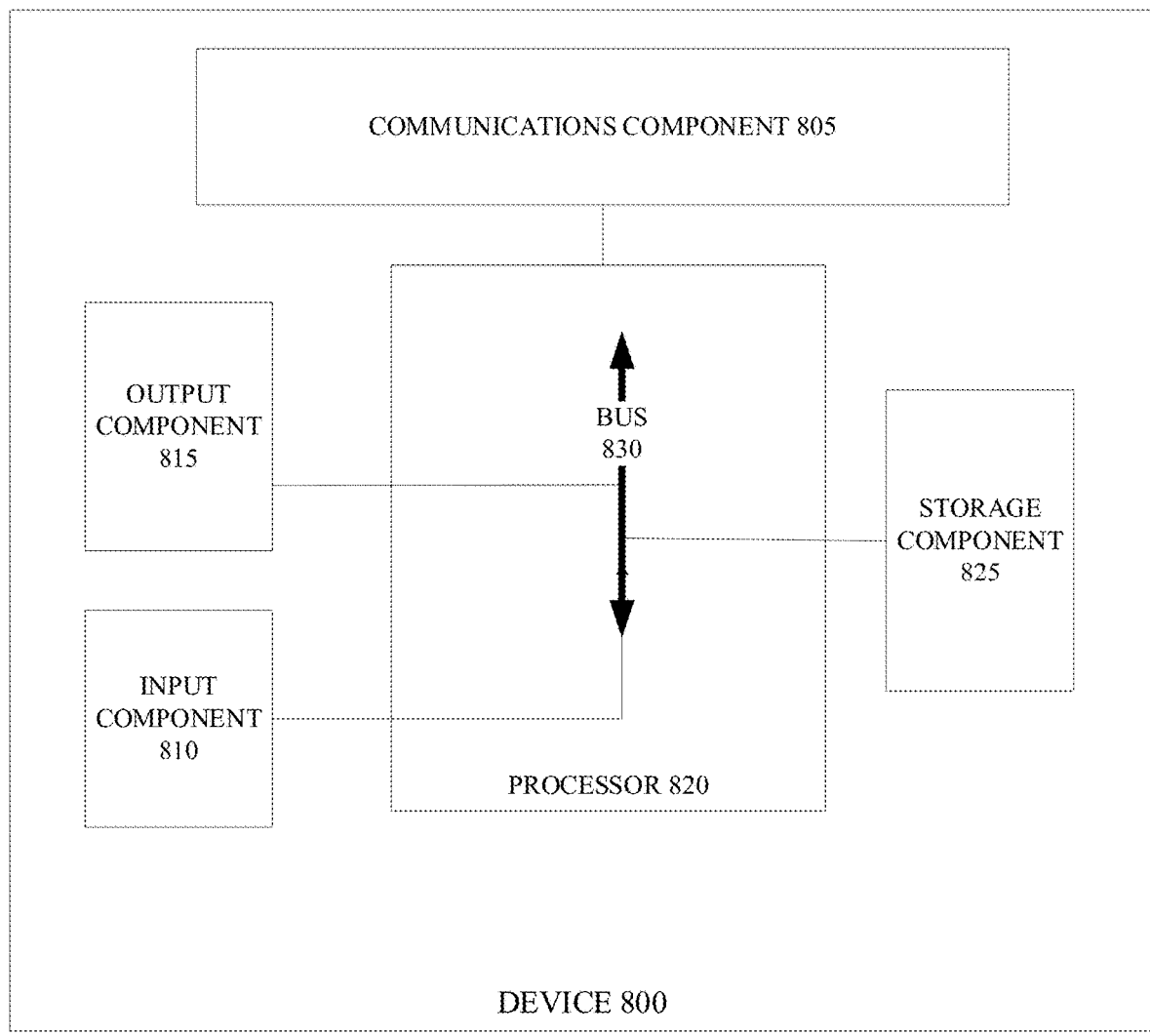
FIG. 8 is a diagram of example components of one or more devices of FIG. 1.

FIG. 8 is a diagram of example components of one or more devices of FIG. 1. In some implementations, host 102 may include one or more devices 800 and/or one or more components of device 800. Device 800 may include, for example, a communications component 805, an input component 810, an output component 815, a processor 820, a storage component 825, and a bus 830. Bus 830 may include components that enable communication among multiple components of device 800, wherein components of device 800 may be coupled to be in communication with other components of device 800 via bus 830.

Input component 810 may include components that permit device 800 to receive information via user input (e.g., keypad, a keyboard, a mouse, a pointing device, a microphone, and/or a display screen), and/or components that permit device 800 to determine the location or other sensor information (e.g., an accelerometer, a gyroscope, an actuator, another type of positional or environmental sensor). Output component 815 may include components that provide output information from device 800 (e.g., a speaker, display screen, and/or the like). Input component 810 and output component 815 may also be coupled to be in communication with processor 820.

Processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 may include one or more processors capable of being programmed to perform a function. Processor 820 may be implemented in hardware, firmware, and/or a combination of hardware and software.

Storage component 825 may include one or more memory devices, such as random-access memory (RAM) 114, read-only memory (ROM), and/or another type of dynamic or static storage device (e.g., a flash memory, a magnetic memory, and/or optical memory) that stores information and/or instructions for use by processor 820. A memory device may include memory space within a single physical storage device or memory space spread across multiple physical storage devices. Storage component 825 may also store information and/or software related to the operation and use of device 800. For example, storage component 825 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 805 may include a transceiver-like component that enables device 800 to communicate with other devices, such as via a wired connection, a wireless connection, or a combination of wired and wireless connections. The communications component 805 may permit device 800 to receive information from another device and/or provide information to another device. For example, communications component 805 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 805 may also include one or more broadband and/or narrowband transceivers and/or other similar types of wireless transceiver configurable to communicate via a wireless network for infrastructure communications. Communications component 805 may also include one or more local area network or personal area network transceivers, such as a Wi-Fi transceiver or a Bluetooth transceiver.

Device 800 may perform one or more processes described herein. For example, device 800 may perform these processes based on processor 820 executing software instructions stored by a non-transitory computer-readable medium, such as storage component 825. As used herein, the term "computer-readable medium" refers to a non-transitory memory device. Software instructions may be read into storage component 825 from another computer-readable medium or from another device via communications component 805. When executed, software instructions stored in storage component 825 may cause processor 820 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more" Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device performs a format operation for host devices using different format times and commands configurations, the storage device comprises:
   a memory device to store data; and
   a controller to receive an erase command from a host device, determine a format time and a chunk size associated with data in the erase command, execute a format operation scheme to perform an erase operation on the data in the erase command within the format time, and halt execution of the erase operation and return operation to the host device when the format time expires.

2. The storage device of claim 1, wherein the controller executes a first format operation scheme including calculating a chunk erase time during which to perform the erase operation on a chunk of data and halting execution of the erase operation on the chunk of data when the chunk erase time expires.

3. The storage device of claim 2, wherein the controller determines a total number of chunks to erase by dividing a total capacity of the storage drive by the chunk size plus one and calculates the chunk erase time by dividing format time by the total number of chunks to erase.

4. The storage device of claim 2, wherein the controller keeps track of logical block addresses in the chunk of data that were not invalidated before the chunk erase time expired and invalidates entries for the logical block addresses during background operations.

5. The storage device of claim 1, wherein the controller executes a second format operation scheme including starting an erase timer upon receipt of the erase command and running the erase timer until one of another host command that is not the erase command is received and the format time expires.

6. The storage device of claim 5, when the controller receives another host command that is not the erase command, the controller resets the erase timer.

7. The storage device of claim 5, wherein the controller keeps track of logical block addresses in a chunk of data that were not invalidated before the format time expired and invalidates entries for the logical block addresses during background operations.

8. The storage device of claim 1, wherein the controller executes a third format operation scheme including determining that the erase command is for a single chunk including logical block addresses starting from a first logical block address and ending with a last logical block address in a logical-to-physical table and setting a valid fragment count for each meta block to zero and erasing control pages.

9. The storage device of claim 1, wherein the controller one of obtains the format time from the host device, obtains the format time from a specification, obtains a predefined time for the format time, and dynamically calculates the format time.

10. A method for performing a format operation on a storage device for host devices using different format times and commands configurations, the storage device comprises a controller for performing the method comprising:
    receiving an erase command from a host device;
    determining a format time and a chunk size associated with data in the erase command;
    executing a format operation scheme to perform an erase operation on the data in the erase command within the format time; and halting execution of the erase operation and returning operation to the host device when the format time expires.

11. The method of claim 10, further comprising executing a first format operation scheme including calculating a chunk erase time during which to perform the erase operation on a chunk of data and halting execution of the erase operation on the chunk of data when the chunk erase time expires.

12. The method of claim 11, further comprising determining a total number of chunks to erase by dividing a total capacity of the storage drive by the chunk size plus one and calculating the chunk erase time by dividing format time by the total number of chunks to erase.

13. The method of claim 12, further comprising keeping track of logical block addresses in the chunk of data that were not invalidated before the chunk erase time expired and invalidating entries for the logical block addresses during background operations.

14. The method of claim 10, further comprising executing a second format operation scheme including starting an erase timer upon receipt of the erase command and running the erase timer until one of another host command that is not the erase command is received and the format time expires.

15. The method of claim 14, further comprising resetting the erase timer when the controller receives another host command.

16. The method of claim 15, further comprising keeping track of logical block addresses in a chunk of data that were not invalidated before the format time expired and invalidating entries for the logical block addresses during background operations.

17. The method of claim 10, further comprising executing a third format operation scheme including determining that the erase command is for a single chunk including logical block addresses starting from a first logical block address and ending with a last logical block address in a logical-to-physical table, setting a valid fragment count for each meta block to zero and erasing control pages.

18. The method of claim 10, further comprising one of obtaining the format time from the host device, obtaining the format time from a specification, obtaining a predefined time for the format time, and dynamically calculating the format time.

19. A method for performing a format operation on a storage device for host devices using different format times and commands configurations, the storage device comprises a controller for performing the method comprising:
receiving an erase command from a host device;
determining a format time and a chunk size associated with data in the erase command;
executing one of a first format operation scheme, a second format operation scheme, and a third format operation scheme to perform an erase operation on the data in the erase command within the format time,
the first format operation scheme including calculating a chunk erase time during which to perform the erase operation on a chunk of data and halting execution of the erase operation on the chunk of data when the chunk erase time expires,
the second format operation scheme including starting an erase timer upon receipt of the erase command and running the erase timer until one of another host command is received and the format time expires, and
the third format operation scheme including determining that the erase command is for a single chunk including logical block addresses starting from a first logical block address and ending with a last logical block address in a logical-to-physical table, setting a valid fragment count for each meta block to zero, and erasing control pages; and
halting execution of the erase operation and returning operation to the host device when the format time expires.

20. The method of claim 19, further comprising keeping track of logical block addresses in the chunk of data that were not invalidated before the format time expired and invalidating entries for the logical block addresses during background operations.

* * * * *